(12) United States Patent
Hu et al.

(10) Patent No.: US 12,147,330 B2
(45) Date of Patent: Nov. 19, 2024

(54) SMART TEST DATA WORKLOAD GENERATION

(71) Applicant: International Business Machines Corporation, Armonk, NY (US)

(72) Inventors: Xue Rui Hu, Beijing (CN); Wang Liu, Beijing (CN); Meng Wan, Beijing (CN); Mei Qin Si, Beijing (CN); Li Na Guo, Beijing (CN); Hong Yan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/481,399

(22) Filed: Sep. 22, 2021

(65) Prior Publication Data

US 2023/0089759 A1  Mar. 23, 2023

(51) Int. Cl.
*G06F 9/44* (2018.01)
*G06F 11/32* (2006.01)
*G06F 11/34* (2006.01)
*G06F 11/36* (2006.01)
*G06F 18/214* (2023.01)
*G06N 20/00* (2019.01)

(52) U.S. Cl.
CPC ........ *G06F 11/3688* (2013.01); *G06F 11/328* (2013.01); *G06F 11/3414* (2013.01); *G06F 11/3692* (2013.01); *G06F 18/214* (2023.01); *G06N 20/00* (2019.01)

(58) Field of Classification Search
CPC .. G06F 11/3688; G06F 18/214; G06F 11/328; G06F 11/3414; G06F 11/3692; G06N 20/00
See application file for complete search history.

(56) References Cited

U.S. PATENT DOCUMENTS

| 8,489,926 | B2 | 7/2013 | Kube | |
| 9,164,874 | B1* | 10/2015 | Tomay | G06F 11/366 |
| 9,846,634 | B2 | 12/2017 | Ji | |
| 10,901,763 | B2 | 1/2021 | Li | |
| 11,461,168 | B1* | 10/2022 | Vilke | H03M 7/30 |
| 2004/0205474 | A1* | 10/2004 | Eskin | H04L 63/1416 |
| | | | | 713/188 |

(Continued)

FOREIGN PATENT DOCUMENTS

CN  111881054 A  11/2020
WO  2020072701 A1  4/2020

*Primary Examiner* — Hang Pan
(74) *Attorney, Agent, or Firm* — Anthony M. Pallone

(57) ABSTRACT

In an approach for smart test data workload generation, a processor receives a plurality of expected image frames for a user interface application to be tested. The plurality of expected image frames is pre-defined and represents a series of workflows and operations of the user interface application to be expected based on a design requirement. A processor calculates a first set of hash-values for each corresponding expected image frame. A processor samples the user interface application with a frequency to a plurality of testing image frames during a test run on the user interface application. A processor calculates a second set of hash-values for each sampled testing image frame. A processor compares the first set of hash-values to the second set of hash-values. A processor verifies that the second set of hash-values matches the first set of hash-values.

20 Claims, 7 Drawing Sheets

(56) References Cited

U.S. PATENT DOCUMENTS

| | | | |
|---|---|---|---|
| 2013/0097700 A1* | 4/2013 | Chen | H04L 63/126 |
| | | | 726/22 |
| 2014/0334733 A1* | 11/2014 | Lavi | G06F 16/535 |
| | | | 382/192 |
| 2018/0107580 A1* | 4/2018 | Zhang | G06V 30/40 |
| 2019/0324890 A1* | 10/2019 | Li | G06F 8/38 |
| 2020/0026536 A1 | 1/2020 | Li | |
| 2021/0109844 A1 | 4/2021 | Christopher | |

* cited by examiner

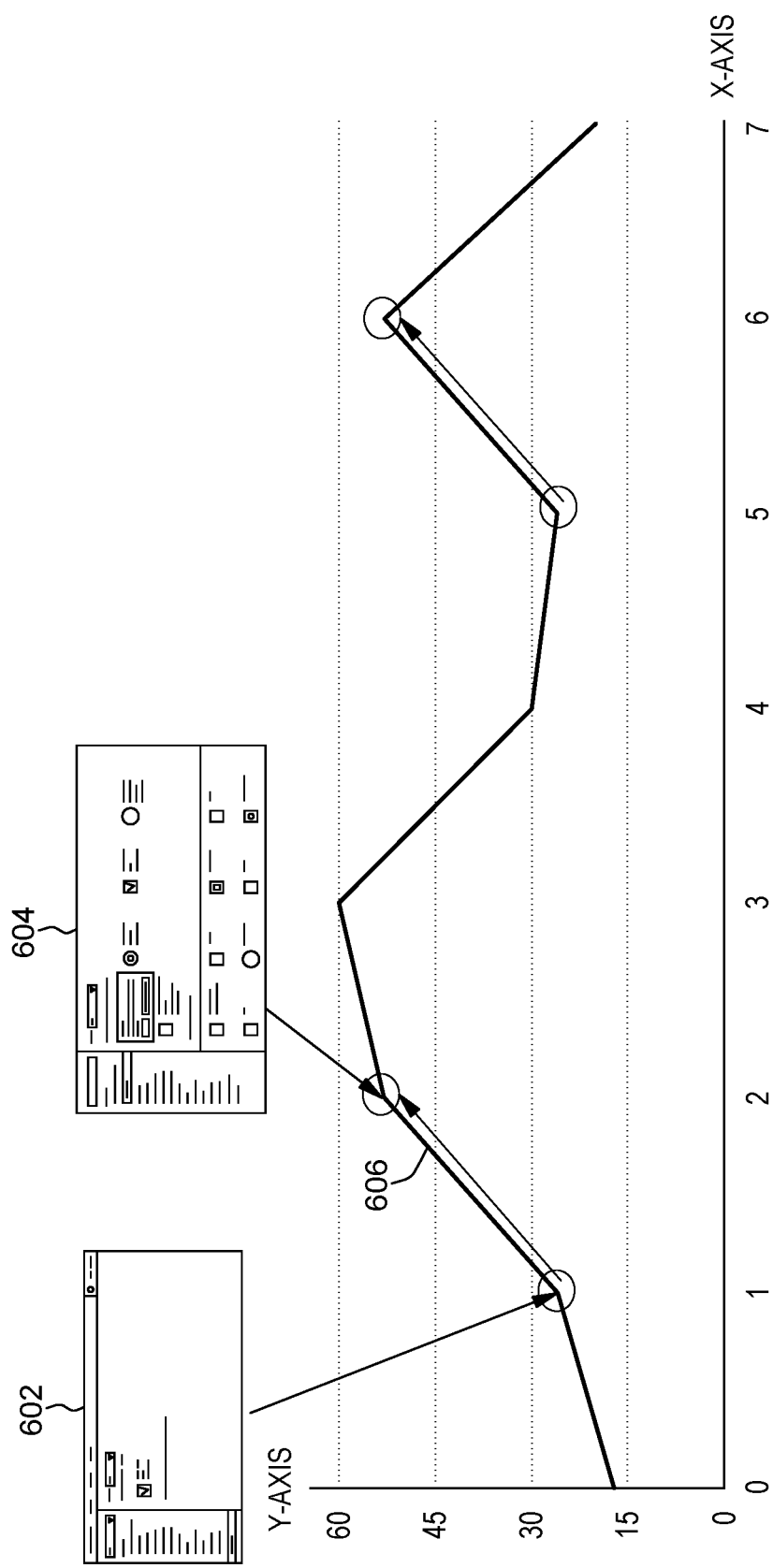

SMART TEST DATA WORKLOAD GENERATION

BACKGROUND

The present disclosure relates generally to the field of user interface application verification, and more particularly to smart test data workload generation based on a learning system for user interface application verification.

A user interface is the space where interactions between humans and machines occur. The goal of this interaction is to allow effective operation and control of the machine from the human end, whilst the machine simultaneously feeds back information that aids the operators' decision-making process. Generally, the goal of user interface design is to produce a user interface which makes it easy, efficient, and user-friendly to operate a machine in the way which produces the desired result.

User interface testing is the process of testing the visual elements of an application to validate whether the application accurately meets the expected performance and functionality. By testing the user interface, testers can validate that user interface functions are free from defects. The testing may involve testing all visual indicators and graphical icons, including menus, radio buttons, text boxes, check-boxes, toolbars, colors, fonts, and more. User interface testing may be performed manually or with an automated testing tool. Regardless of the method used, the goal is to ensure all user interface elements meet the requested specifications. User interface testing may be centered around two main things. First, checking how the application handles user actions carried out. Second, checking whether visual elements are displayed and working correctly. User interface testing plays a significant role before an application is released to production.

SUMMARY

Aspects of an embodiment of the present disclosure disclose an approach for smart test data workload generation. A processor receives a plurality of expected image frames for a user interface application to be tested. The plurality of expected image frames is pre-defined and represents a series of workflows and operations of the user interface application to be expected based on a design requirement. A processor calculates a first set of hash-values for each corresponding expected image frame. A processor samples the user interface application with a frequency to a plurality of testing image frames during a test run on the user interface application. A processor calculates a second set of hash-values for each sampled testing image frame. A processor compares the first set of hash-values to the second set of hash-values. A processor verifies that the second set of hash-values matches the first set of hash-values.

BRIEF DESCRIPTION OF THE DRAWINGS

FIGS. 6A-6B illustrate exemplary functional diagrams of the application testing module within the computing device of FIG. 1, in accordance with an embodiment of the present disclosure.

DETAILED DESCRIPTION

The present disclosure is directed to systems and methods for smart test data workload generation based on a learning system for user interface application verification.

Embodiments of the present disclosure recognize a need for user interface automation testing during a stage of developing a web application or mobile application. Embodiments of the present disclosure disclose systems and methods for generating smart test data workloads for user interface testing, enabling a developer to record user interfaces according to test cases and using recorded data to verify test results while running an automation test. Embodiments of the present disclosure disclose using key frames to represent workflows and processes of a user interface application. Embodiments of the present disclosure disclose sampling the application operations and behaviors during a user interface automation test. Embodiments of the present disclosure disclose transforming key frames and samples of testing to a set of hash-values and using one or more unique hash-value to represent a state of an application operation. Embodiments of the present disclosure disclose verifying the test from hash-values and building application behavior paths from the hash-values. Embodiments of the present disclosure disclose creating a smart test model based on the behavior paths for application anomaly detection.

Embodiments of the present disclosure disclose systems and methods to improve the efficiency of user interface automation testing and to detect application anomaly. Embodiments of the present disclosure disclose systems and methods to record user interface screens according to test cases. The recoded data can be used to verify the results for automation testing. Embodiments of the present disclosure disclose creating key frames before testing. The key frames may represent workflows and processes of the user interface application. During the user interface automation testing, a program may sample the application. The program may transform key frames and samples to a set of hash-values that each hash-value represents a moment of application behavior. Embodiments of the present disclosure disclose mapping hash-values between the key frames and samples to user interface automation test cases. Embodiments of the present disclosure disclose building behavior paths from the hash-values. Embodiments of the present disclosure disclose training an artificial intelligence model based on testing data which can be used for application anomaly detection after the application is deployed as a product. The artificial intelligence model can predict the next state from user's input and action based on the current state, so that the artificial intelligence model can be used for application anomaly detection. When the model predicts the state is different with what a user really obtains, the model may detect an application anomaly accordingly.

Figure 1:
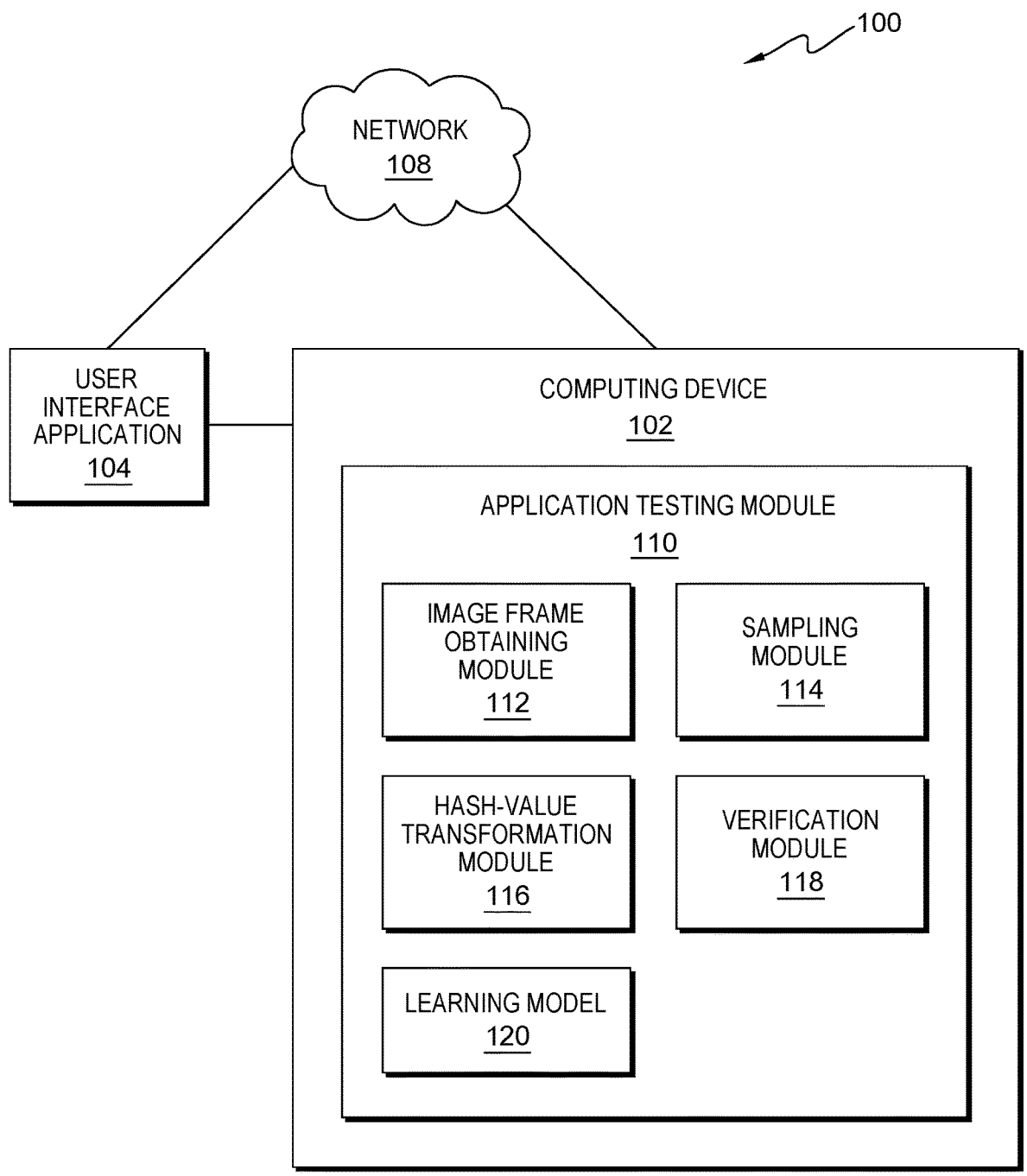
FIG. 1 is a functional block diagram illustrating a user interface application testing environment, in accordance with an embodiment of the present disclosure.

The present disclosure will now be described in detail with reference to the Figures. FIG. 1 is a functional block diagram illustrating a user interface application testing environment, generally designated 100, in accordance with an embodiment of the present disclosure.

In the depicted embodiment, user interface application testing environment 100 includes computing device 102, user interface application 104, and network 108. In the depicted embodiment, user interface application 104 is located externally and may be accessed through a communication network such as network 108. User interface application 104 may be accessed directly by computing device 102. In other embodiments, user interface application 104 may be located on computing device 102. In an example, user interface application 104 may be a web application. In another example, user interface application 104 may be a mobile application. In another example, user interface application 104 may be an application with a user interface in any suitable environment. Application testing module 110 may run an automation test on user interface application 104. The test may make sure user interface application 104 to work as expected per a design requirement.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to application testing module 110 and network 108 and is capable of processing program instructions and executing application testing module 110, in accordance with an embodiment of the present disclosure. Computing device 102 may include internal and external hardware components, as depicted and described in further detail with respect to FIG. 7.

Further, in the depicted embodiment, computing device 102 includes application testing module 110. In the depicted embodiment, application testing module 110 is located on computing device 102. However, in other embodiments, application testing module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and application testing module 110, in accordance with a desired embodiment of the disclosure.

In one or more embodiments, application testing module 110 is configured to receive a plurality of expected image frames (e.g., keyframes) for user interface application 104 to be tested. The plurality of expected image frames may be pre-defined based on a design requirement for user interface application 104. The plurality of expected image frames may represent a series of workflows and operations of user interface application 104 to be expected based on the design requirement. An expected image frame may refer to a screenshot of a certain key node operating on user interface application 104. For example, an expected image frame may be a screen of the loading page. In another example, an expected image frame may be a screen of the display after the page loads. In another example, an expected image frame may be a screen of the result returned after the page operates to click a button. When a user needs to operate according to a test case, the user may set the expected results as key frames. A series of key frames reflects a series of operations and results of user interface application 104.

In one or more embodiments, application testing module 110 is configured to sample user interface application 104 with a frequency into a plurality of testing image frames during a test run on user interface application 104. Application testing module 110 may sample application operations during a user interface automation test. For example, when running an automation test, application testing module 110 may record the process of testing. This process may not require a manual involvement. Application testing module 110 may set a window or page that needs to be recorded. Application testing module 110 may capture a test screen at a certain frequency. Application testing module 110 may sample user interface application 104 in a specified frequency, for example, in a common video frame rate, such as 25 frames per second, 30 frames per second, 60 frames per second, or in other suitable frequencies.

In one or more embodiments, application testing module 110 is configured to calculate a set of hash-values for each corresponding expected image frame predefined for user interface application 104 to be tested based on a design requirement. Each hash-value for the corresponding expected image frame is unique. Application testing module 110 may calculate another set of hash-values for each sampled testing image frame sampled from user interface application 104 during an automation test. Application testing module 110 may apply an algorithm to all the images to convert the images as unique hash-values. In an example, application testing module 110 may check a similarity for each sampled testing image frame using an artificial intelligence technology based on a pre-defined similarity threshold. Application testing module 110 may use an artificial intelligence technology to check the similarity of images before converting the images into hash-values. In another example, application testing module 110 may ensure an expected image frame and a sampled image frame have a same image size and resolution. If the expected image frame and the sampled image frame have a different image size and resolution, application testing module 110 may convert them into a same coordinate before hashing. Application testing module 110 may transform keyframes and samples of testing to a set of hash-values and using one or more unique hash-value to represent a state of the application behavior of user interface application 104. The same samples or keyframes will have the same hash-values.

In one or more embodiments, application testing module 110 is configured to compare a first set of hash-values, based on a plurality of expected image frames for user interface application 104 to be tested, to a second set of hash-values based on a plurality of testing image frames during a test run on user interface application 104. Application testing module 110 may verify whether the second set of hash-values matches the first set of hash-values. Application testing module 110 may compare each hash-value in the first set of hash-values to a corresponding hash-value in the second set of hash-values. Application testing module 110 may match each hash-value in the first set of hash-values to a corresponding hash-value in the second set of hash-values. Application testing module 110 may test user interface application 104 by matching the first and second sets of hash-values. Application testing module 110 may compare each hash-value of the keyframes to a hash-value of the samples one by one. For a mismatched hash-value, application testing module 110 may indicate the test fails for the given keyframe. A user may check the keyframe and the sample image that is associated with this hash-value to find out the failure. Application testing module 110 may create a "behavior path" with hash-values. A "behavior path" may represent a bunch of steps associated with operations of user interface application 104. Application testing module 110 may perform a matching process by "behavior paths", not just hash-values. A "behavior path" is reusable just like a test case and may be related with operations of user interface application 104.

In one or more embodiments, application testing module 110 is configured to build operation paths based on hash-values calculated from the expected image frames and sampled images for user interface application 104. Each hash-value may represent a state of an application operation. Application testing module 110 may train learning model 120 based on data of the operation paths. The operation paths may represent a plurality of steps associated with the operations of user interface application 104. Application testing module 110 may predict a next state of user interface application 104 from a user's input based on learning model 120. In an example, an operation path may be a state transition path. The current state with an input from a user to user interface application 104 may result in the next state. Application testing module 110 may train learning model 120 with the data of the operation paths that are collected from automation tests. Learning model 120 may predict the next state from user's inputs and actions based on the current state, so that learning model 120 can be used for application anomaly detection. If learning model 120 predicts the state is different with the expected from user interface application 104, application testing module 110 may indicate an anomaly detection.

Further, in the depicted embodiment, application testing module 110 includes image frame obtaining module 112, sampling module 114, hash-value transformation module 116, verification module 118, and learning model 120. In the depicted embodiment, image frame obtaining module 112, sampling module 114, hash-value transformation module 116, verification module 118, and learning model 120 are located on computing device 102 and application testing module 110. However, in other embodiments, image frame obtaining module 112, sampling module 114, hash-value transformation module 116, verification module 118, and learning model 120 may be located externally and accessed through a communication network such as network 108.

In one or more embodiments, image frame obtaining module 112 is configured to receive a plurality of expected image frames (e.g., keyframes) for user interface application 104 to be tested. The plurality of expected image frames may be pre-defined based on a design requirement for user interface application 104. The plurality of expected image frames may represent a series of workflows and operations of user interface application 104 to be expected based on the design requirement. An expected image frame may be a screenshot of a certain key node operating on user interface application 104. For example, an expected image frame may be a screen of the loading page. In another example, an expected image frame may be a screen of the display after the page loads. In another example, an expected image frame may be a screen of the result returned after the page operates to click a button. When a user needs to operate according to a test case, the user may set the expected results as key frames. A series of key frames reflects a series of operations and results of user interface application 104.

In one or more embodiments, sampling module 114 is configured to sample user interface application 104 with a frequency into a plurality of testing image frames during a test run on user interface application 104. Sampling module 114 may sample application operations during a user interface automation test on user interface application 104. For example, when running an automation test, sampling module 114 may record the process of testing. This process may not require a manual involvement. Sampling module 114 may set a window or page that needs to be recorded. Sampling module 114 may capture a test screen at a certain frequency. Sampling module 114 may sample user interface application 104 in a specified frequency, for example, in a common video frame rate, such as 25 frames per second, 30 frames per second, 60 frames per second, or in other suitable frequencies.

In one or more embodiments, hash-value transformation module 116 is configured to calculate a set of hash-values for each corresponding expected image frame predefined for user interface application 104 to be tested based on a design requirement. Each hash-value for the corresponding expected image frame is unique. Hash-value transformation module 116 may calculate another set of hash-values for each sampled testing image frame sampled from user interface application 104 during an automation test. Hash-value transformation module 116 may apply an algorithm to all the images to convert the images as unique hash-values. In an example, hash-value transformation module 116 may check a similarity for each sampled testing image frame using an artificial intelligence technology based on a pre-defined similarity threshold. Hash-value transformation module 116 may use an artificial intelligence technology to check the similarity of images before converting the images into hash-values. In another example, hash-value transformation module 116 may ensure an expected image frame and a sampled image frame to have a same image size and resolution. If the expected image frame and the sampled image frame have a different image size and resolution, application testing module 110 may convert them into a same coordinate before hashing. Hash-value transformation module 116 may transform keyframes and samples of testing to a set of hash-values and using one or more unique hash-value to represent a state of the application behavior of user interface application 104. The same samples or keyframes may have the same hash-values.

In one or more embodiments, verification module 118 is configured to compare a first set of hash-values, based on a plurality of expected image frames for user interface application 104 to be tested, to a second set of hash-values based on a plurality of testing image frames during a test run on user interface application 104. Verification module 118 may verify whether the second set of hash-values matches the first set of hash-values. Verification module 118 may compare each hash-value in the first set of hash-values to a corresponding hash-value in the second set of hash-values. Verification module 118 may match each hash-value in the first set of hash-values to a corresponding hash-value in the second set of hash-values. Verification module 118 may test user interface application 104 by matching the first and second sets of hash-values. Verification module 118 may compare each hash-value of the keyframes to a hash-value of the samples one by one. For a mismatched hash-value, verification module 118 may indicate the test fails for the given keyframe. A user may check the keyframe and the sample image that is associated with this hash-value to find out the failure. Verification module 118 may create a "behavior path" with hash-values. The behavior path may represent a bunch of steps associated with operations of user interface application 104. Verification module 118 may perform a matching process by behavior paths, not just hash-values. The behavior path may be reusable just like a test case and may be related with operations of user interface application 104.

In one or more embodiments, learning model 120 is configured to build operation paths based on hash-values calculated from the expected image frames and sampled images for user interface application 104. Each hash-value may represent a state of an application operation. Learning model 120 may be trained based on data of the operation paths. The operation paths may represent a plurality of steps associated with the operations of user interface application 104. Learning model 120 may predict a next state of user interface application 104 from a user's input. In an example, an operation path may be a state transition path. The current state with an input from a user to user interface application 104 may result in the next state. Learning model 120 may be trained with the data of the operation paths that are collected from an automation test. Learning model 120 may predict the next state from user's inputs and actions based on the current state, so that learning model 120 can be used for application anomaly detection. If learning model 120 predicts the state is different with the expected from user interface application 104, application testing module 110 may indicate an anomaly detection.

Figure 2:
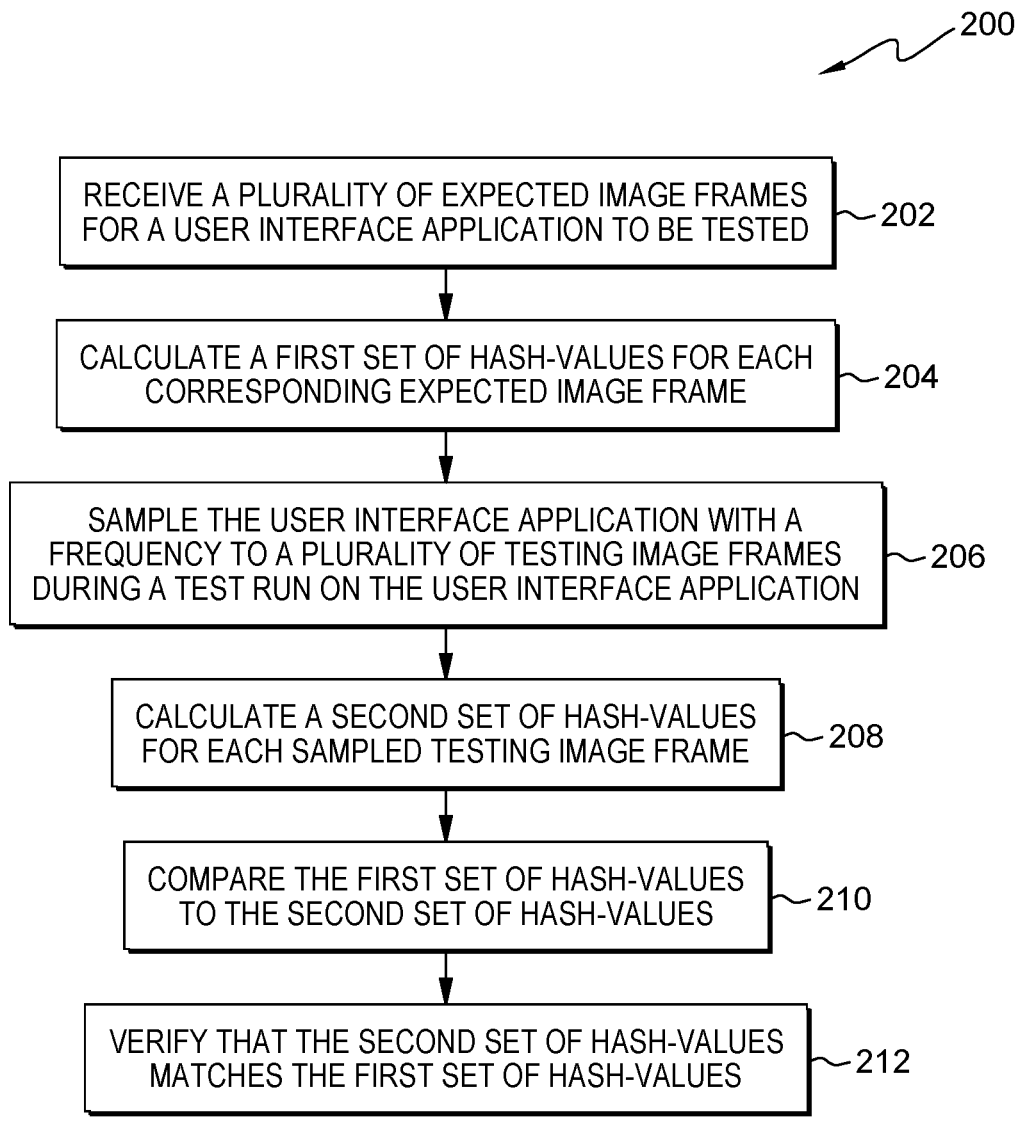
FIG. 2 is a flowchart depicting operational steps of an application testing module within a computing device of FIG. 1, in accordance with an embodiment of the present disclosure.

FIG. 2 is a flowchart 200 depicting operational steps of application testing module 110 in accordance with an embodiment of the present disclosure.

Application testing module 110 operates to receive a plurality of expected image frames (e.g., keyframes) for user interface application 104 to be tested. Application testing module 110 also operates to calculate a set of hash-values for each corresponding expected image frame predefined for user interface application 104 to be tested based on a design requirement. Application testing module 110 operates to sample user interface application 104 with a frequency into a plurality of testing image frames during a test run on user interface application 104. Application testing module 110 operates to calculate a set of hash-values for each sampled testing image frame sampled from user interface application 104 during an automation test. Application testing module 110 operates to compare a first set of hash-values, based on a plurality of expected image frames for user interface application 104 to be tested, to a second set of hash-values based on a plurality of testing image frames during a test run on user interface application 104. Application testing module 110 operates to verify whether the second set of hash-values matches the first set of hash-values.

In step 202, application testing module 110 receives a plurality of expected image frames (e.g., keyframes) for user interface application 104 to be tested. The plurality of expected image frames may be pre-defined based on a design requirement for user interface application 104. The plurality of expected image frames may represent a series of workflows and operations of user interface application 104 to be expected based on the design requirement. An expected image frame may refer to a screenshot of a certain key node operating on user interface application 104. For example, an expected image frame may be a screen of the loading page. In another example, an expected image frame may be a screen of the display after the page loads. In another example, an expected image frame may be a screen of the result returned after the page operates to click a button. When a user needs to operate according to a test case, the user may set the expected results as key frames. A series of key frames reflects a series of operations and results of user interface application 104.

In step 204, application testing module 110 calculates a set of hash-values for each corresponding expected image frame predefined for user interface application 104 to be tested based on a design requirement. Each hash-value for the corresponding expected image frame is unique. Application testing module 110 may apply an algorithm to all the images to convert the images as unique hash-values. In an example, application testing module 110 may check a similarity for each expected image using an artificial intelligence technology based on a pre-defined similarity threshold. Application testing module 110 may use an artificial intelligence technology to check the similarity of images before converting the images into hash-values. Application testing module 110 may transform keyframes to a set of hash-values and using one or more unique hash-value to represent a state of the application behavior of user interface application 104.

In step 206, application testing module 110 samples user interface application 104 with a frequency into a plurality of testing image frames during a test run on user interface application 104. Application testing module 110 may sample application operations during a user interface automation test. For example, when running an automation test, application testing module 110 may record the process of testing. This process does not require a manual involvement. Application testing module 110 may set a window or page that needs to be recorded. Application testing module 110 may capture a test screen at a certain frequency. Application testing module 110 may sample user interface application 104 in a specified frequency, for example, in a common video frame rate, such as 25 frames per second, 30 frames per second, 60 frames per second, or in any other suitable frequencies.

In step 208, application testing module 110 calculates a set of hash-values for each sampled testing image frame sampled from user interface application 104 during an automation test. Application testing module 110 may apply an algorithm to all the images to convert the images as unique hash-values. In an example, application testing module 110 may check a similarity for each sampled testing image frame using an artificial intelligence technology based on a pre-defined similarity threshold. Application testing module 110 may use an artificial intelligence technology to check the similarity of images before converting the images into hash-values. In another example, application testing module 110 may ensure an expected image frame and a sampled image frame have a same image size and resolution. If the expected image frame and the sampled image frame have a different image size and resolution, application testing module 110 may convert them into a same coordinate before hashing. Application testing module 110 may transform samples of testing to a set of hash-values and using one or more unique hash-value to represent a state of the application behavior of user interface application 104. The same samples or keyframes may have the same hash-values.

In step 210, application testing module 110 compares a first set of hash-values, based on a plurality of expected image frames for user interface application 104 to be tested, to a second set of hash-values based on a plurality of testing image frames during a test run on user interface application 104. Application testing module 110 may compare each hash-value in the first set of hash-values to a corresponding hash-value in the second set of hash-values. Application testing module 110 may match each hash-value in the first set of hash-values to a corresponding hash-value in the second set of hash-values. Application testing module 110 may test user interface application 104 by matching the first and second sets of hash-values. Application testing module 110 may compare each hash-value of the keyframes to a hash-value of the samples one by one. For a mismatched hash-value, application testing module 110 may indicate the test fails for the given keyframe.

In step 212, application testing module 110 verifies whether the second set of hash-values matches the first set of hash-values. Application testing module 110 may compare each hash-value in the first set of hash-values to a corresponding hash-value in the second set of hash-values. Application testing module 110 may match each hash-value in the first set of hash-values to a corresponding hash-value in the second set of hash-values. Application testing module 110 may test user interface application 104 by matching the first and second sets of hash-values. For a mismatched hash-value, application testing module 110 may indicate the test fails for the given keyframe. A user may check the keyframe and the sample image that is associated with this hash-value to find out the failure. Application testing module 110 may create a behavior path with hash-values. The behavior path may represent a bunch of steps associated with operations of user interface application 104. Application testing module 110 may perform a matching process by behavior paths, not just hash-values. The behavior path may be reusable just like a test case and may be related with operations of user interface application 104.

Application testing module 110 may build operation paths based on hash-values calculated from the expected image frames and sampled images for user interface application 104. Each hash-value may represent a state of an application operation. Application testing module 110 may train learning model 120 based on data of the operation paths. The operation paths represent a plurality of steps associated with the operations of user interface application 104. Application testing module 110 may predict a next state of user interface application 104 from a user's input based on learning model 120. In an example, an operation path may be a state transition path. The current state with an input from a user to user interface application 104 may result in the next state. Application testing module 110 may train learning model 120 with the data of the operation paths that are collected from an automation test. Learning model 120 may predict the next state from user's inputs and actions based on the current state, so that learning model 120 can be used for application anomaly detection. If learning model 120 predicts the state is different with the expected from user interface application 104, application testing module 110 may indicate an anomaly detection.

Figure 3:
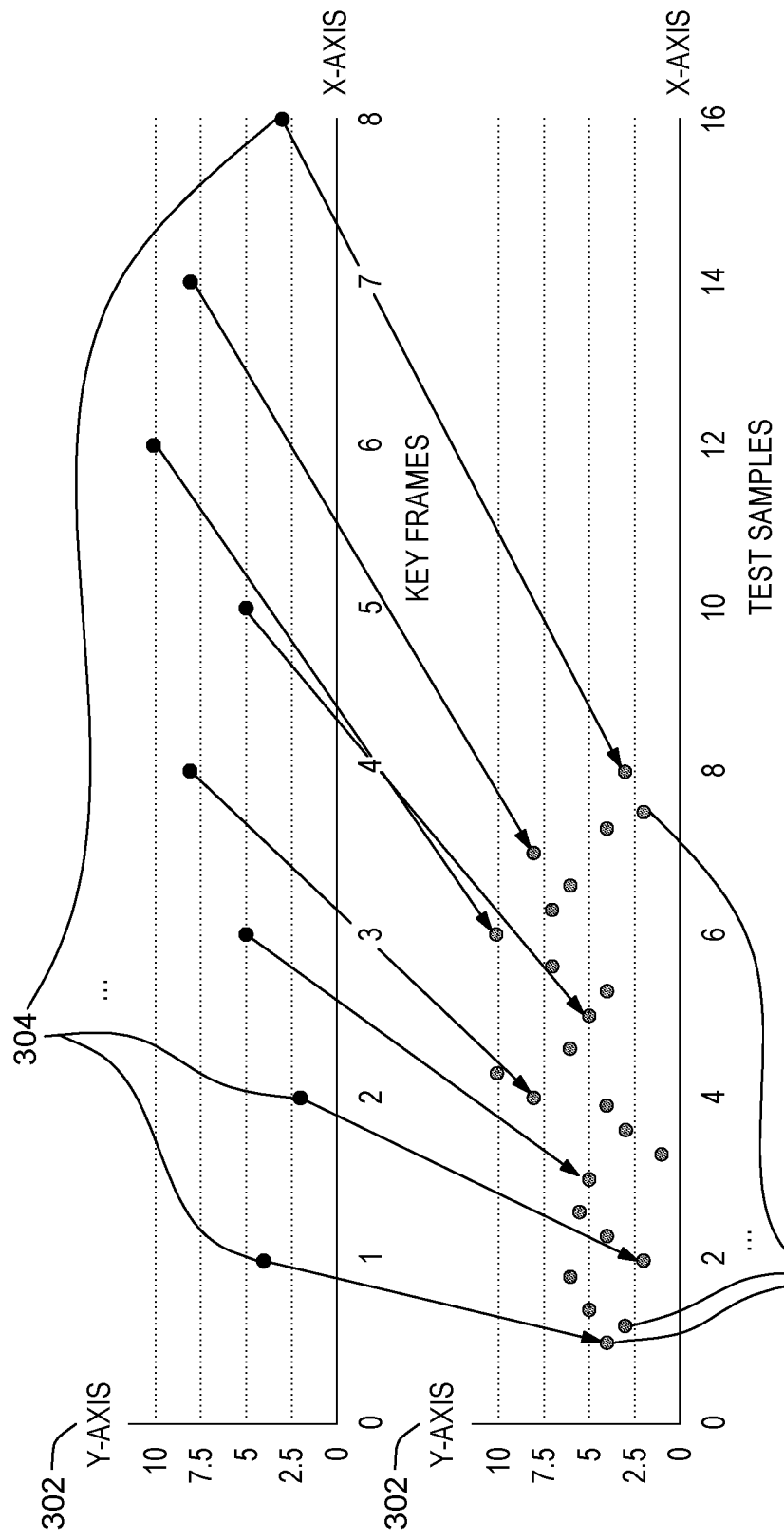
FIG. 3 illustrates an exemplary matching function of the application testing module within the computing device of FIG. 1, in accordance with an embodiment of the present disclosure.

FIG. 3 illustrates an exemplary matching function of application testing module 110, in accordance with an embodiment of the present disclosure.

In the example of FIG. 3, for key frames, the x-axis may represent the sequence of steps of expected image frames (e.g., key frames) of user interface application 104. For samples, the x-axis may represent the time of frequency for sampling user interface application 104. The y-axis is example hash-values 302 for each expected image frame and sampled image frame. Application testing module 110 may compare a first set 304 of hash-values, based on a plurality of expected image frames for user interface application 104 to be tested, to a second set 306 of hash-values based on a plurality of testing image frames during a test run on user interface application 104. Application testing module 110 may verify whether the second set 306 of hash-values matches the first set 304 of hash-values. Application testing module 110 may compare each hash-value in the first set 308 of hash-values to a corresponding hash-value in the second set 306 of hash-values. Application testing module 110 may match each hash-value in the first set 304 of hash-values to a corresponding hash-value in the second set 306 of hash-values.

Figure 4:
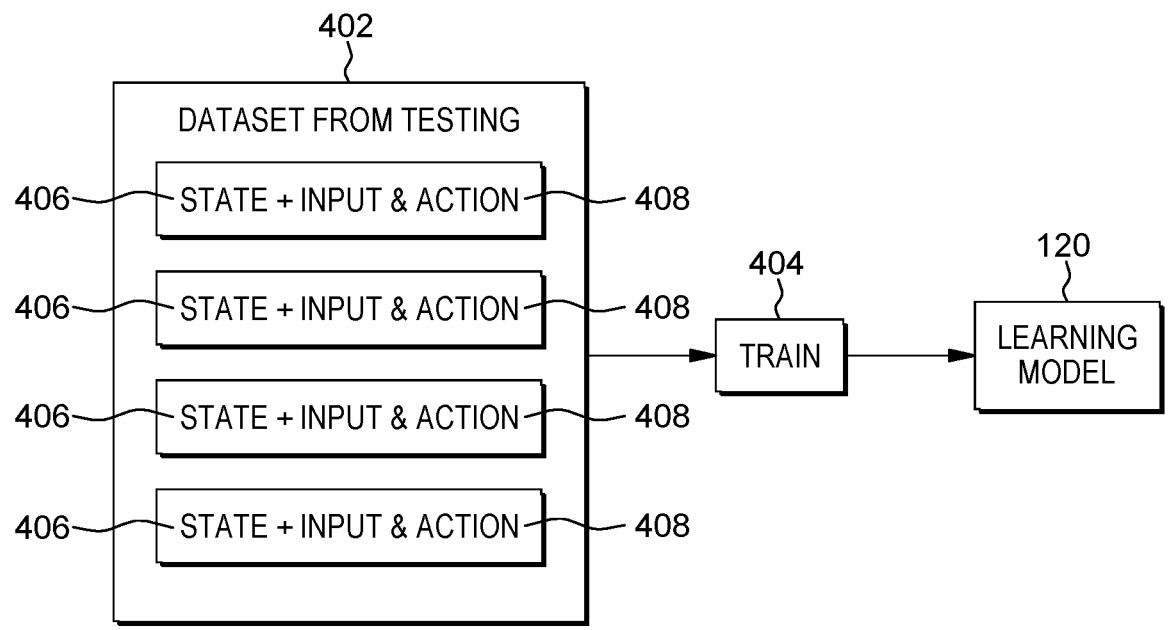
FIG. 4 illustrates an exemplary functional diagram of a learning model in the application testing module within the computing device of FIG. 1, in accordance with an embodiment of the present disclosure.

FIG. 4 illustrates an exemplary functional diagram of learning model 120 in application testing module 110, in accordance with an embodiment of the present disclosure.

In the example of FIG. 4, application testing module 110 may train 404 learning model 120 based on dataset 402 collected from automation tests on user interface application 104. Dataset 402 includes data of state 406 and input/action 408 during the testing. For example, each hash-value may represent a state of an application operation. An operation path may represent a plurality of steps associated with the operations of user interface application 104. Application testing module 110 may predict a next state of user interface application 104 from a user's input based on learning model 120. The current state with an input from a user to user interface application 104 may result in the next state. Learning model 120 may predict the next state from user's inputs and actions based on the current state, so that learning model 120 can be used for application anomaly detection.

Figure 5:
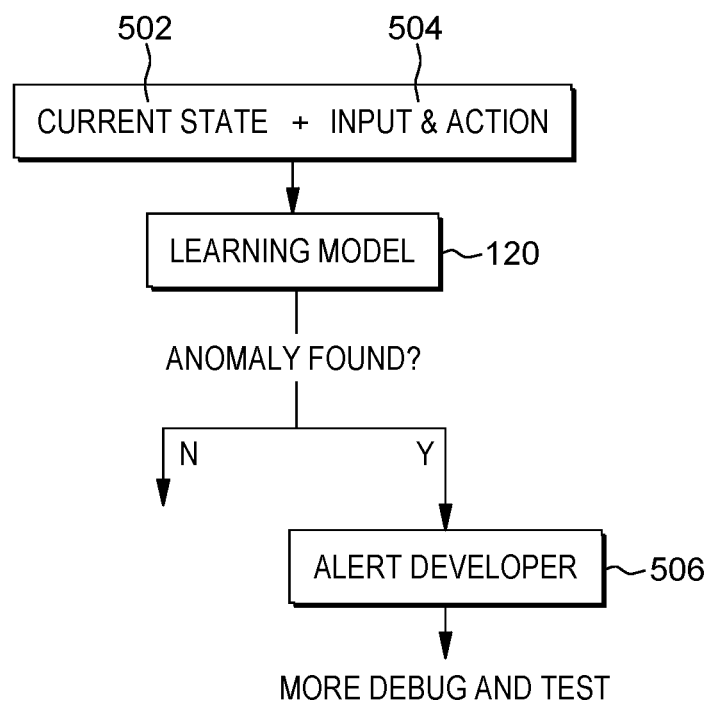
FIG. 5 illustrates an exemplary functional flowchart of the learning model in the application testing module within the computing device of FIG. 1, in accordance with an embodiment of the present disclosure.

FIG. 5 illustrates an exemplary functional flowchart of learning model 120 in application testing module 110, in accordance with an embodiment of the present disclosure.

In the example of FIG. 5, learning model 120 receives data of current state 502 and input/action 504 from a user in testing user interface application 104. Learning model 120 has been pre-trained based on data collected from automation tests on user interface application 104. Learning model 120 may predict the next state from the user's input/action 504 based on current state 503. Learning model 120 may determine whether an anomaly is detected. If learning model 120 determines that an anomaly is detected, learning model 120 may alert a developer 504 about the anomaly. The developer may further debug and test user interface application 104 subject to detecting the anomaly related to user interface application 104.

Figure 6B:
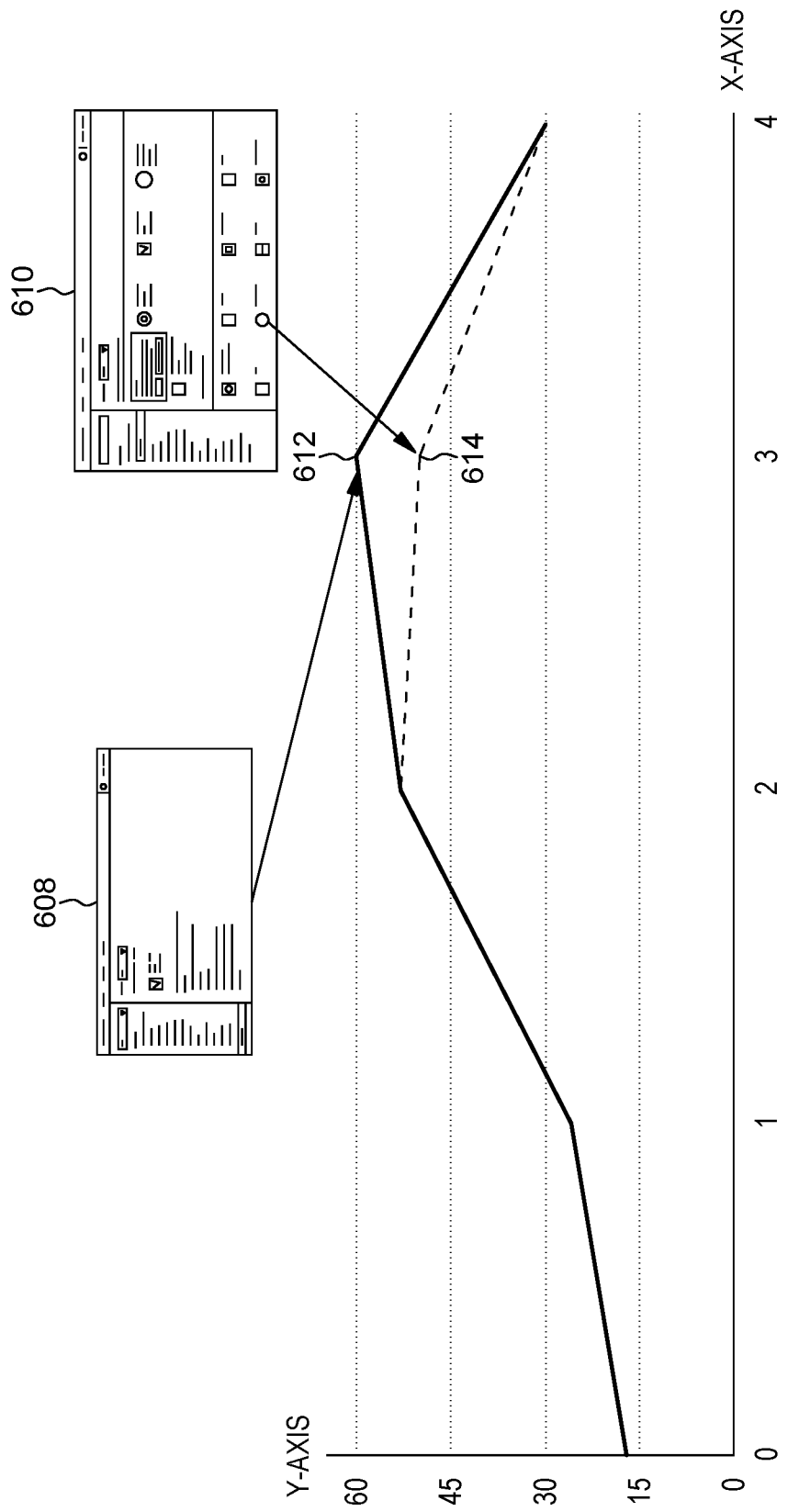

FIGS. 6A-6B illustrate exemplary functional diagrams of application testing module 110, in accordance with an embodiment of the present disclosure.

In the example of FIG. 6A, application testing module 110 may create a "behavior path" (operation path) 606 with hash-values calculated from image frames, e.g., 602, 604, for user interface application 104. Behavior path 606 may represent a bunch of steps associated with operations of user interface application 104. Application testing module 110 may perform a matching process by behavior path 606, not just hash-values. Behavior path 606 may be reusable just like a test case and may be related with operations of user interface application 104. In the example of FIG. 6B, application testing module 110 may detect a mismatch of hash-values 612, 614 for image frames 608, 610 and may indicate the test fails for the given keyframe 608. A user may check the keyframe and the sample image that is associated with this hash-value to find out the failure.

Figure 7:
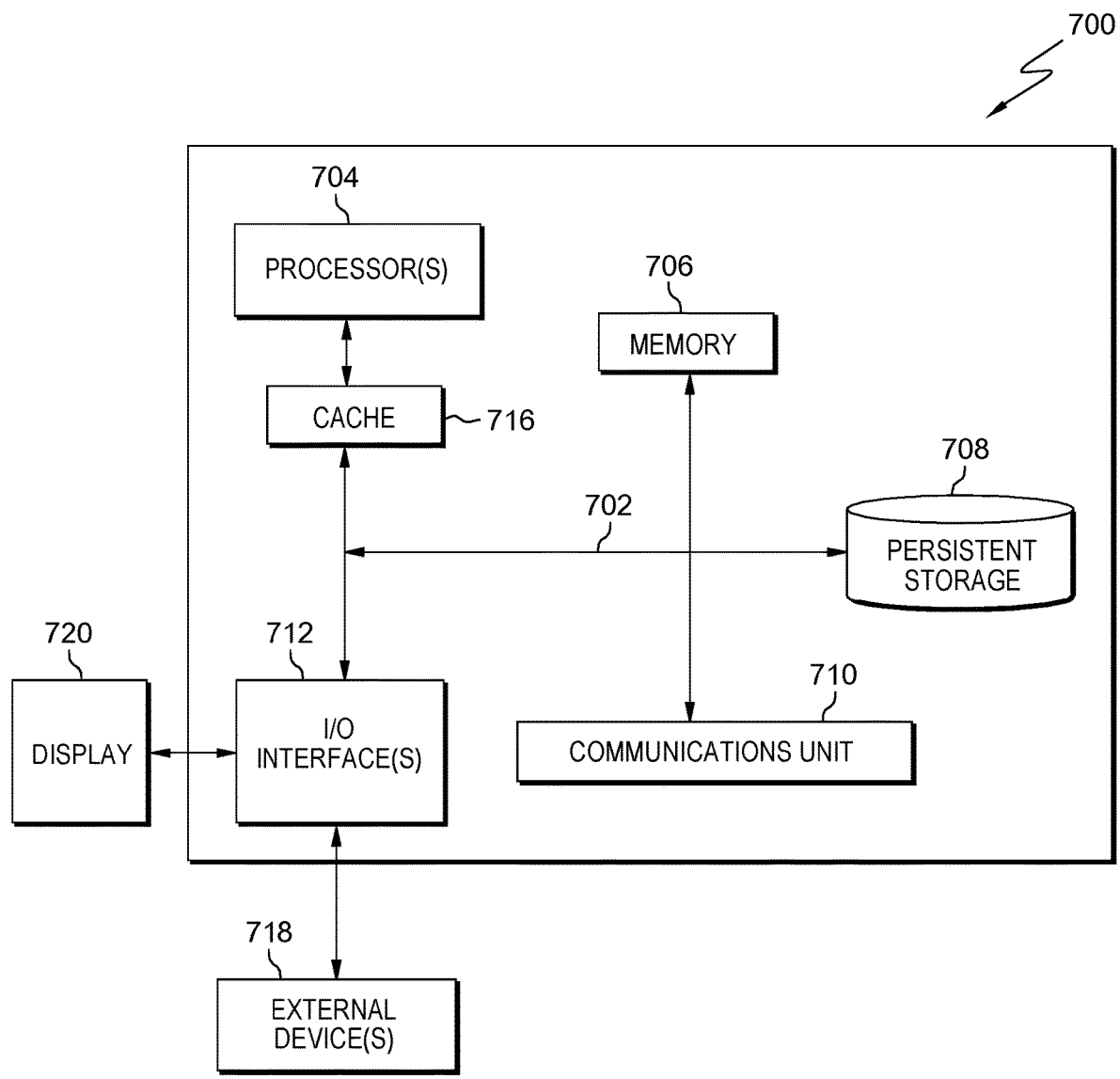
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Application testing module 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Application testing module 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., application testing module 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, a plurality of expected image frames for a user interface application to be tested, the plurality of expected image frames being pre-defined and representing a series of workflows and operations of the user interface application to be expected based on a design requirement;
   sampling, by one or more processors, the user interface application at a specified frequency to capture a plurality of testing image frames during an automation test run on the user interface application, wherein the automation test run is recorded, and wherein the specified frequency comprises a common video frame rate;
   ensuring that expected image frames, of the plurality of expected image frames, and corresponding sampled image frames, of the plurality of testing image frames, have a same image size and resolution by converting the expected image frames and the corresponding sampled image frames into a same coordinate before hashing of the expected image frames and the testing image frames;
   calculating, by one or more processors, a first set of hash-values for each corresponding expected image frame;
   calculating, by one or more processors, a second set of hash-values for each sampled testing image frame;
   building a first operation path based on the first set of hash-values and building a second operation path based on the second set of hash-values, each hash-value representing a state of a user interface application operation;
   comparing, by one or more processors, the first set of hash-values to the second set of hash-values, and performing a matching process between the first operation path and the second operation path;
   verifying, by one or more processors, whether the second set of hash-values matches the first set of hash-values; and
   in response to a hash-value of the second set of hash-values not matching a corresponding hash-value of the first set of hash-values, indicating the automation test run on the user interface application fails for an expected image frame associated with the hash-value of the first set of hash-values.

2. The computer-implemented method of claim 1, further comprising:

training, by one or more processors, a learning model for application anomaly detection based on the first operation path and the second operation path.

3. The computer-implemented method of claim 2, further comprising:
predicting, by one or more processors, a next state of the user interface application from a user's input based on the learning model.

4. The computer-implemented method of claim 2, wherein an operation path represents a plurality of steps associated with the operations of the user interface application.

5. The computer-implemented method of claim 1, wherein calculating the second set of hash-values for each sampled testing image frame comprises checking a similarity for each sampled testing image frame using an artificial intelligence technology based on a pre-defined similarity threshold.

6. The computer-implemented method of claim 1, wherein each hash-value for the corresponding expected image frame is unique.

7. The computer-implemented method of claim 1, wherein verifying that the second set of hash-values matches the first set of hash-values comprises matching each hash-value in the first set of hash-values to a corresponding hash-value in the second set of hash-values.

8. A computer program product comprising:
one or more computer readable storage media, and program instructions collectively stored on the one or more computer readable storage media, the program instructions comprising:
program instructions to receive a plurality of expected image frames for a user interface application to be tested, the plurality of expected image frames being pre-defined and representing a series of workflows and operations of the user interface application to be expected based on a design requirement;
program instructions to sample the user interface application at a specified frequency to capture a plurality of testing image frames during an automation test run on the user interface application, wherein the automation test run is recorded, and wherein the specified frequency comprises a common video frame rate;
program instructions to ensure that expected image frames, of the plurality of expected image frames, and corresponding sampled image frames, of the plurality of testing image frames, have a same image size and resolution by converting the expected image frames and the corresponding sampled image frames into a same coordinate before hashing of the expected image frames and the testing image frames;
program instructions to calculate a first set of hash-values for each corresponding expected image frame;
program instructions to calculate a second set of hash-values for each sampled testing image frame;
program instructions to build a first operation path based on the first set of hash-values and build a second operation path based on the second set of hash-values, each hash-value representing a state of a user interface application operation;
program instructions to compare the first set of hash-values to the second set of hash-values, and perform a matching process between the first operation path and the second operation path;
program instructions to verify whether the second set of hash-values matches the first set of hash-values; and
in response to a hash-value of the second set of hash-values not matching a corresponding hash-value of the first set of hash-values, program instructions to indicate the automation test run on the user interface application fails for an expected image frame associated with the hash-value of the first set of hash-values.

9. The computer program product of claim 8, further comprising:
program instructions to train a learning model for application anomaly detection based on the first operation path and the second operation path.

10. The computer program product of claim 9, further comprising:
program instructions to predict a next state of the user interface application from a user's input based on the learning model.

11. The computer program product of claim 9, wherein an operation path represents a plurality of steps associated with the operations of the user interface application.

12. The computer program product of claim 8, wherein program instructions to calculate the second set of hash-values for each sampled testing image frame comprise program instructions to check a similarity for each sampled testing image frame using an artificial intelligence technology based on a pre-defined similarity threshold.

13. The computer program product of claim 8, wherein each hash-value for the corresponding expected image frame is unique.

14. The computer program product of claim 8, wherein program instructions to verify that the second set of hash-values matches the first set of hash-values comprise program instructions to match each hash-value in the first set of hash-values to a corresponding hash-value in the second set of hash-values.

15. A computer system comprising:
one or more computer processors, one or more computer readable storage media, and program instructions stored on the one or more computer readable storage media for execution by at least one of the one or more computer processors, the program instructions comprising:
program instructions to receive a plurality of expected image frames for a user interface application to be tested, the plurality of expected image frames being pre-defined and representing a series of workflows and operations of the user interface application to be expected based on a design requirement;
program instructions to sample the user interface application at a specified frequency to capture a plurality of testing image frames during an automation test run on the user interface application, wherein the automation test run is recorded, and wherein the specified frequency comprises a common video frame rate;
program instructions to ensure that expected image frames, of the plurality of expected image frames, and corresponding sampled image frames, of the plurality of testing image frames, have a same image size and resolution by converting the expected image frames and the corresponding sampled image frames into a same coordinate before hashing of the expected image frames and the testing image frames;

program instructions to calculate a first set of hash-values for each corresponding expected image frame;
program instructions to calculate a second set of hash-values for each sampled testing image frame;
program instructions to build a first operation path based on the first set of hash-values and build a second operation path based on the second set of hash-values, each hash-value representing a state of a user interface application operation;
program instructions to compare the first set of hash-values to the second set of hash-values, and perform a matching process between the first operation path and the second operation path;
program instructions to verify whether the second set of hash-values matches the first set of hash-values; and
in response to a hash-value of the second set of hash-values not matching a corresponding hash-value of the first set of hash-values, program instructions to indicate the automation test run on the user interface application fails for an expected image frame associated with the hash-value of the first set of hash-values.

16. The computer system of claim 15, further comprising:
program instructions to train a learning model for application anomaly detection based on the first operation path and the second operation path.

17. The computer system of claim 16, further comprising:
program instructions to predict a next state of the user interface application from a user's input based on the learning model.

18. The computer system of claim 16, wherein an operation path represents a plurality of steps associated with the operations of the user interface application.

19. The computer system of claim 15, wherein program instructions to calculate the second set of hash-values for each sampled testing image frame comprise program instructions to check a similarity for each sampled testing image frame using an artificial intelligence technology based on a pre-defined similarity threshold.

20. The computer system of claim 15, wherein each hash-value for the corresponding expected image frame is unique.

* * * * *